Patented May 19, 1931

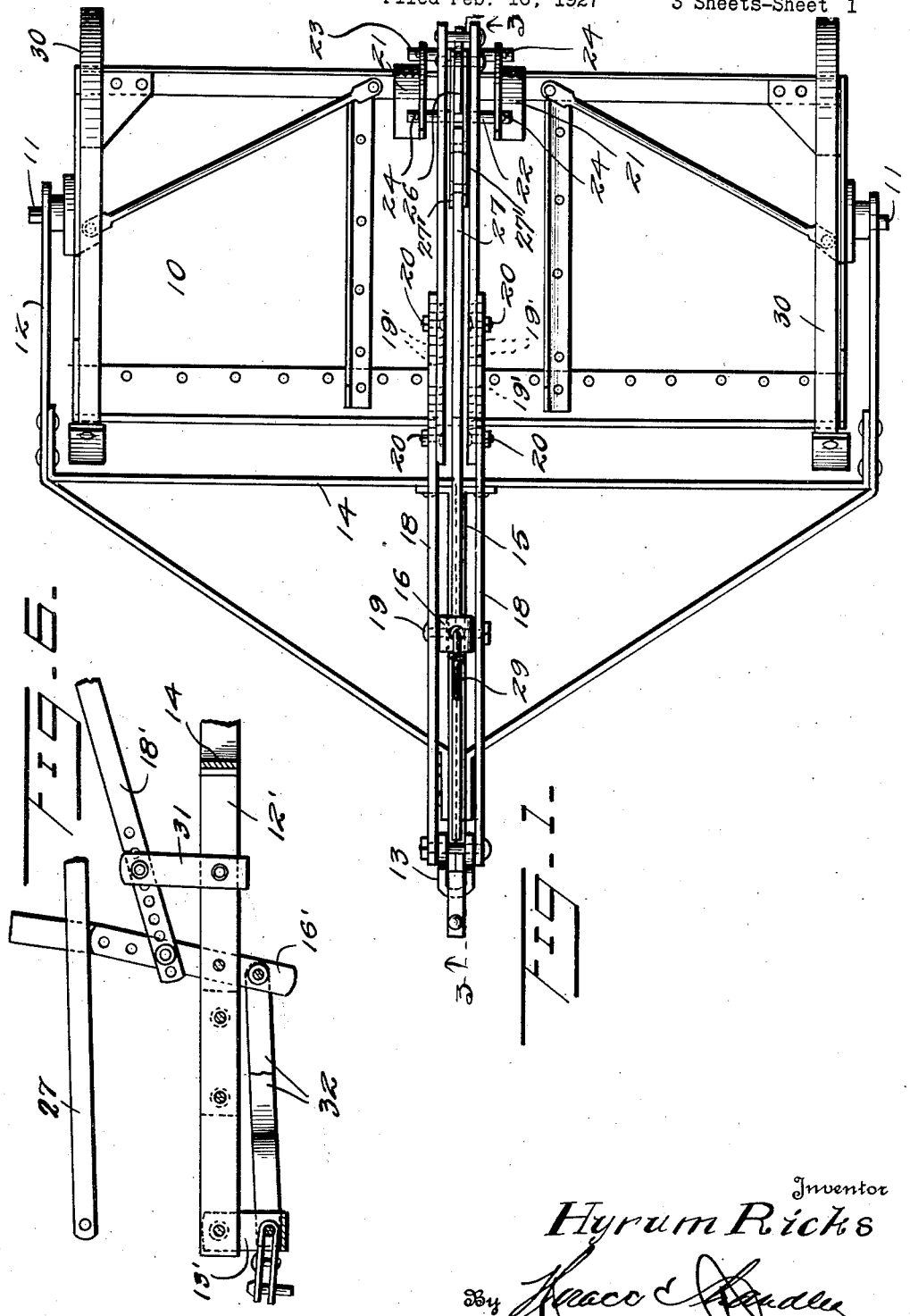

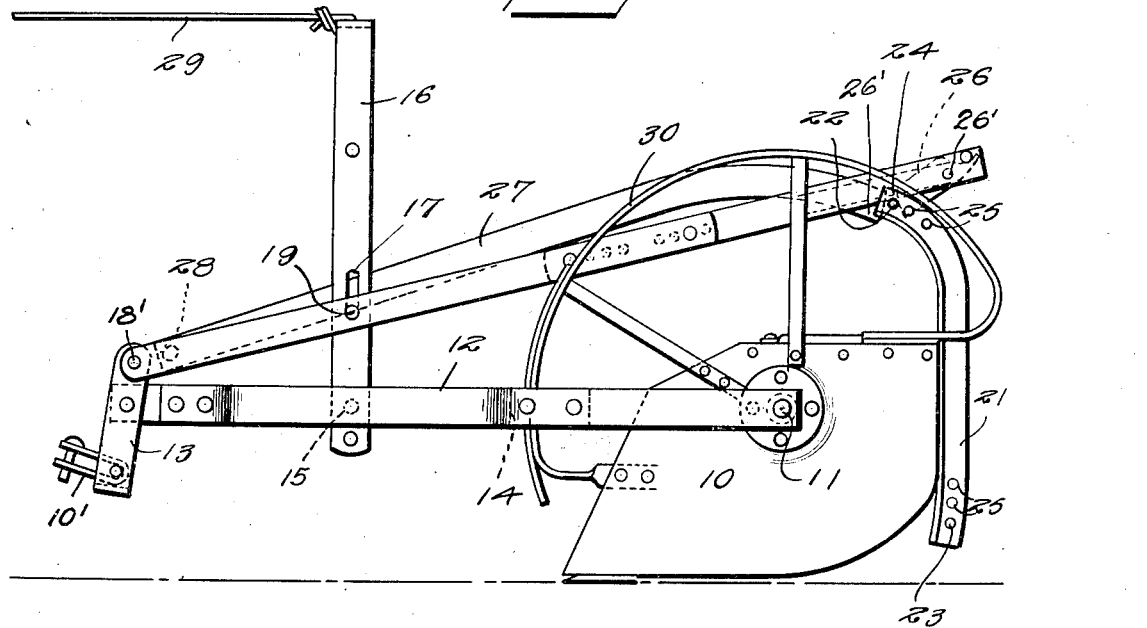
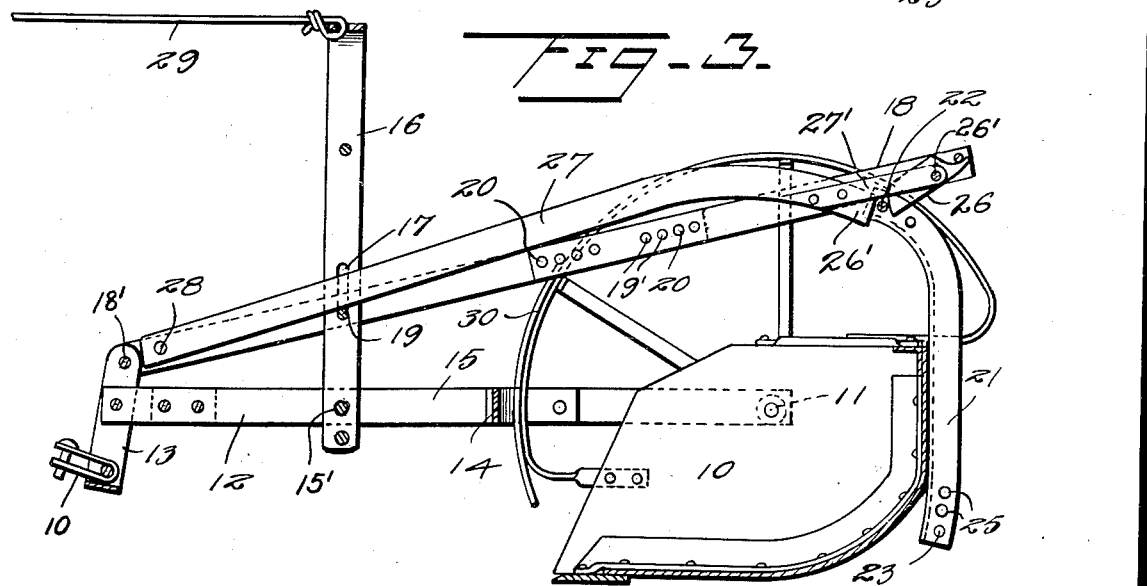

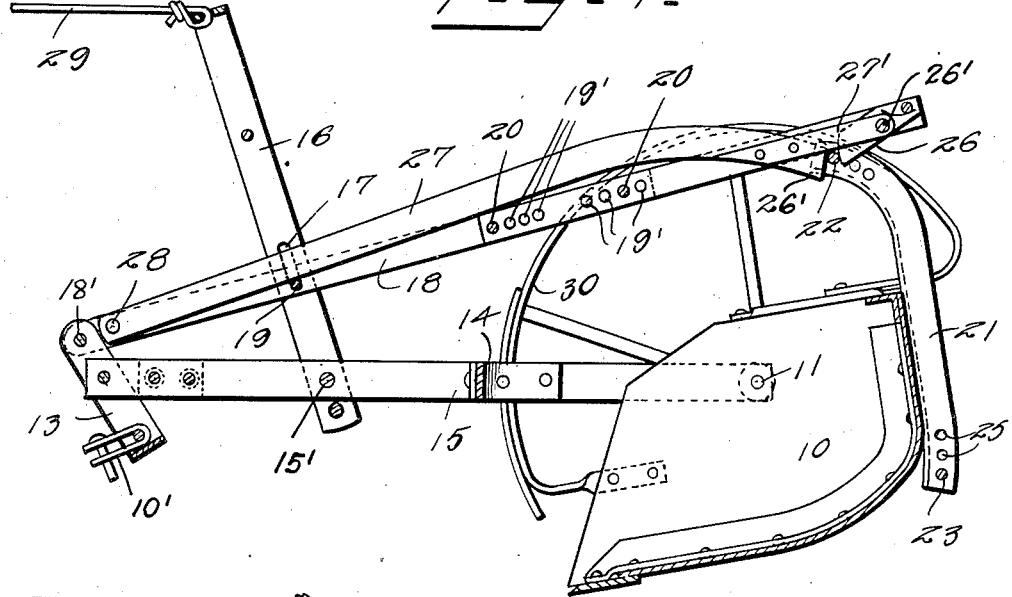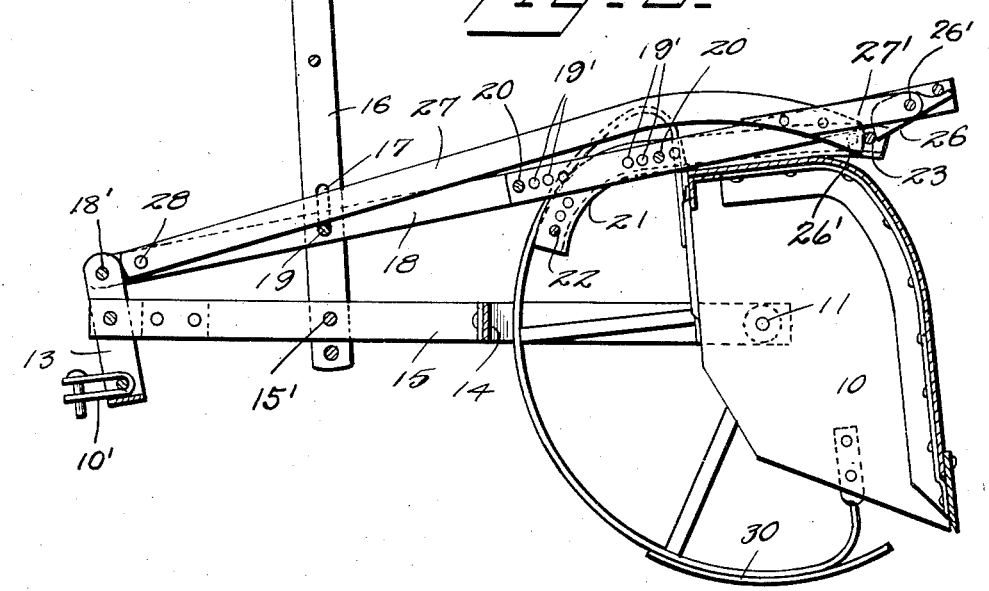

1,806,219

UNITED STATES PATENT OFFICE

HYRUM RICKS, OF LOS ANGELES, CALIFORNIA

SCRAPER

Application filed February 16, 1927. Serial No. 168,751.

This invention relates to new and useful improvements in scrapers, and particularly to road or field scrapers.

One object of the invention is to provide a device of this character wherein the scoop is normally held in non-scraping position, and which is provided with means whereby the operator may tilt the scoop into digging position, at will.

Another object is to provide a device of this character which is equipped with means for permitting the scoop to turn into digging or loading position, and then be released so as to automatically move into dumping and leveling position.

Another object is to provide means operable to lock the scoop in digging or loading position, and in dumping position, successively, at the will of the operator.

A further object is to provide a device of this character which includes means for holding the scoop in either digging or dumping positions, and which means is operable to release the scoop to permit the same to make a complete revolution, on the ground, back into normal non-digging position, to be engaged by the holding means.

A still further object is to provide a device of this character wherein the means operable upon the scoop is in cooperation with the draft means, whereby to provide a balance between these means so that the operation of the scoop holding means is rendered easy.

Other objects and advantages will be apparent from the following description when taken in connection with the accompanying drawings.

In the drawings:

Figure 1 is a top plan view of the device.

Figure 2 is a side elevation of the same, the scoop being in non-digging position.

Figure 3 is a sectional view on the line 3—3 of Figure 1.

Figure 4 is a similar sectional view showing the scoop in digging position.

Figure 5 is a similar sectional view showing the scoop in dumping position.

Figure 6 is a sectional view, similar to Fig. 3, showing a modified form of the device.

Referring particularly to the accompanying drawings, 10 represents a scraping scoop, having the pintles 11 in the end walls to which are connected the arms of the draft frame 12, said frame extending forwardly in converging relation and carrying, on the forward end, the centrally pivoted vertical rockable member 13. The lower end of the member 13 is provided with the means 10' for connecting the same to the draft lug of a tractor. Connected to the frame 12, and extending transversely of the front of the scraper, is a bar 14, and connected to the intermediate portion of said bar, at its rear end, and to the convergent ends of the frame is a forwardly extending brace member 15. Straddling the intermediate portion of the brace 15, and pivoted thereto, at 15', is the vertically extending lever 16. In the intermediate portion of this lever 16 there is formed a longitudinal slot 17. Pivotally connected, at 18', to the upper end of the rockable member 13, and extending rearwardly in straddling relation to the lever 16, are the bars 18, a pin 19 being disposed through said bars and said slot 17, for the purpose of permitting forward and rearward sliding movement of said bars 18, upon rocking the said lever. These bars 18 are capable of adjustability, as to their lengths, by means of the apertures 19', and bolts 20. Secured to the back of the scoop 10, and extending vertically in parallel relation, are the guides 21, the upper ends of said guides being curved forwardly over, and above the upper edge of the back of the scoop. Extending between these curved ends of the guides, is a transverse pin or bolt 22, to which reference will be made later herein. Similarly disposed between the other ends of the guides is a pin 23. Each of these pins is removably held in the openings of the guides by means of the cotter pins 24. It will be noted that the ends of the guides are provided with the series of openings 25, for interchangeable reception of the pins or bolts 22 and 23. The rear ends of the bars 18 extend over the upper pin 22, and pivotally mounted between said ends of the bars, on the pivot pin 26', carried thereon, is a gravity pawl 26, arranged to engage with said pin, whereby to hold the scoop against any tendency toward rearward tilting action. Disposed between the bars 18 is a lever 27, the rear end of which is provided with a pair of rearwardly extending arms 27', which straddle the pawl 26, and are pivotally supported on the pivot of said pawl. The rear end of the lever 27 is turned downwardly to form the nose 26', which engages with the forward side of the pin 22. The forward end of the lever 27 is provided with an opening 28 in which may be secured any suitable means whereby the driver may lift the lever, from his seat on the tractor. The upper end of the lever 16 is provided with an opening in which is secured one end of a flexible member, such as the rope 29, which rope is grasped by the driver of the tractor, for the purpose of pulling the lever forwardly, whereby to cause the pawl 26 to impart an initial tilt of the scoop so that the edge thereof will engage with the ground. The ends of the scoop are provided with the shoes or runners 30, on which the scoop is adapted to roll, or to drag, according to the position of the scoop, whether or not the pawl 26, and lever 27 are engaged with either of the pins or bolts 22—23.

It will be noted that the normal forward pull of the tractor, on the clevis, or connection with the forward ends of the bars 18, that is the lower end of the rocker 13, urges the bars 18 rearwardly, with the result that the rear end of the lever 27 presses against the upper pin 22, causing the scoop to tilt rearwardly, and elevate its foredge above the ground, whereby to prevent digging action thereof. When the operator desires to place the scoop in digging and loading position, he pulls the rope 29, causing the lever 16 to move forward, drawing the bars 18 with it, and thereby engaging the pawl 26 with the pin 22, which rocks the scoop forwardly to engage its digging edge in the ground.

When it is desired to dump the loaded scoop, the operator lifts the forward end of the lever 27, so as to elevate the nose 26' above the pin 22, when the normal contact of the scoop with the ground, will cause the scoop to roll forwardly, as the scoop is drawn over the ground, the pin 22 passing freely beneath said nose. If the operator releases the lever 27, immediately after it has become disengaged from the pin 22, the said lever will engage with the pin 23, when the scoop has rolled into that position, thus causing the scoop to remain in such position and permitting the digging edge to properly level the material dumped from the scoop. After the scoop is empty, the operator again raises the lever 27, whereby the scoop rolls or turns on the ground until the pin 22 is again engaged between the pawl 26, and the adjacent end of the lever 27, whereby the scoop is restored to its non-digging position.

In Figure 6, there is shown a modification of the bars and levers, wherein the bars 18' are pivotally connected to the frame 12', by means of the vertical bracket 31, and the rocker 13' is pivotally connected to the forward end of the frame at its upper end. Links 32 are pivotally connected to the lower end of the rocker 13' and to the lower end of the lever 16', this latter lever being pivotally supported on the frame 12'. The action of this form of the invention has the same results as that of the first form. The releasing lever is shown at 27.

What is claimed is:

1. In a scraping and leveling device, the combination with a rotary scoop having a stop pin, a movable arm having an end adjacent said stop pin and having a detent engaging with one side of said stop pin for preventing retrograde rotation of said scoop, and a lever having one end pivotally mounted on said arm adjacent said detent and having a nose on said pivoted end engaging the other side of said stop pin.

2. In a scraping and leveling device, the combination with a rotary scoop having a stop pin, an arm having an end adjacent said stop pin, a pawl pivotally carried by said arm engaging one side of said stop pin to prevent retrograde rotation of the scoop, a lever extending longitudinally of said arm and having an end curved downwardly to provide a nose engaged with the other side of said stop pin and an arm carried by said lever extending beyond said end and pivotally mounted on said first-named arm coincidentally with the said pawl, whereby said lever may be swung on its pivot to disengage its nose from said stop pin so that said scoop may rotate forwardly.

3. In a scraping and leveling device, the combination with a rotary scoop having a stop pin, a movable arm having an end adjacent said pin and having a detent engaging with one side of said pin for preventing retrograde rotation of said scoop, and a lever extending longitudinally of said arm and having one end pivotally connected to said arm adjacent said detent, said lever having a downwardly curved portion forming a nose engaged with the other side of said stop pin and movable to disengage said nose from said pin to permit forward rotation of the scoop.

4. In a scraping and leveling device, the combination with a rotary scoop having a stop pin, a movable arm having an end adjacent said pin and having a detent engaging with one side of said pin for preventing retrograde rotation of said scoop, and a manually operable lever extending longitudinally of said arm and having a downwardly curved portion forming a nose engaged with the other side of said stop pin to prevent forward rotation of said scoop, said lever being pivotally connected beyond said nose to said arm adjacent said detent.

In testimony whereof, I affix my signature.

HYRUM RICKS.